United States Patent
Lee (10) Patent No.: US 9,326,024 B2
(45) Date of Patent: Apr. 26, 2016

(54) METHOD AND APPARATUS FOR PROVIDING ADVERTISEMENT SERVICE IN DIGITAL BROADCAST RECEIVER

(75) Inventor: Ji-Young Lee, Seoul (KR)

(73) Assignee: ALTICAST Corp., Seoul (KR)

( * ) Notice: Subject to any disclaimer, the term of this patent is extended or adjusted under 35 U.S.C. 154(b) by 581 days.

(21) Appl. No.: 12/647,835

(22) Filed: Dec. 28, 2009

(65) Prior Publication Data

US 2010/0169915 A1      Jul. 1, 2010

(30) Foreign Application Priority Data

Dec. 30, 2008   (KR) ........................ 10-2008-0137590

(51) Int. Cl.
| | |
|---|---|
| *H04N 21/235* | (2011.01) |
| *H04N 21/431* | (2011.01) |
| *H04N 21/435* | (2011.01) |
| *H04N 21/443* | (2011.01) |
| *H04N 21/44* | (2011.01) |
| *H04N 21/482* | (2011.01) |
| *H04N 21/61* | (2011.01) |
| *H04N 21/81* | (2011.01) |

(52) U.S. Cl.
CPC .......... *H04N 21/435* (2013.01); *H04N 21/235* (2013.01); *H04N 21/4312* (2013.01); *H04N 21/4314* (2013.01); *H04N 21/44016* (2013.01); *H04N 21/4438* (2013.01); *H04N 21/4821* (2013.01); *H04N 21/6125* (2013.01); *H04N 21/812* (2013.01)

(58) Field of Classification Search
CPC ............ H04N 21/235; H04N 21/4312; H04N 21/4314; H04N 21/435; H04N 21/812; H04N 21/4438; H04N 21/4821; H04N 21/6125; H04N 21/44016
USPC .......................................................... 725/42
See application file for complete search history.

(56) References Cited

U.S. PATENT DOCUMENTS

| | | | | | |
|---|---|---|---|---|---|
| 5,903,314 | A | * | 5/1999 | Niijima et al. .................. | 725/44 |
| 6,005,601 | A | * | 12/1999 | Ohkura et al. .................. | 725/45 |
| 7,174,512 | B2 | * | 2/2007 | Martin et al. ................... | 725/44 |
| 7,421,724 | B2 | * | 9/2008 | Klosterman et al. ............ | 725/42 |
| 7,634,789 | B2 | * | 12/2009 | Gerba et al. .................... | 725/42 |
| 7,685,619 | B1 | * | 3/2010 | Herz .............................. | 725/40 |

(Continued)

FOREIGN PATENT DOCUMENTS

| | | |
|---|---|---|
| KR | 10-2006-0042770 A | 5/2006 |
| KR | 10-2006-0052525 A | 5/2006 |
| KR | 10-2006-0100591 A | 9/2006 |

*Primary Examiner* — Randy Flynn
(74) *Attorney, Agent, or Firm* — Jefferson IP Law, LLP (57) ABSTRACT

A method for providing an advertisement service in a digital broadcast receiver is disclosed. The method includes receiving a broadcast signal over a broadcast network; extracting configuration data of lattice-type video contents and at least one advertisement video from the received broadcast signal; editing the extracted configuration data of lattice-type video contents and displaying the edited configuration data on a display means of a user terminal as a channel selection screen; upon receipt of a focus move request from a user while providing the channel selection screen, selecting a video content corresponding to the focus move request; and if a focus moved by the focus move request of the user has been located on the selected video content for a predetermined time or more, displaying the advertisement video on the display means in contiguity with the selected video content.

12 Claims, 6 Drawing Sheets

(56) References Cited

U.S. PATENT DOCUMENTS

| | | |
|---|---|---|
| 8,327,397 B2 | 12/2012 | Cho |
| 2002/0073424 A1* | 6/2002 | Ward et al. ............... 725/42 |
| 2002/0120933 A1* | 8/2002 | Knudson et al. ........... 725/42 |
| 2002/0138834 A1* | 9/2002 | Gerba et al. ............... 725/42 |
| 2004/0268392 A1* | 12/2004 | Tanaka ...................... 725/42 |
| 2006/0098002 A1 | 5/2006 | Inoue |
| 2006/0107302 A1* | 5/2006 | Zdepski ..................... 725/32 |
| 2007/0107010 A1* | 5/2007 | Jolna et al. ................ 725/34 |
| 2007/0136750 A1* | 6/2007 | Abanami et al. ........... 725/44 |
| 2008/0040028 A1* | 2/2008 | Crump ....................... 701/208 |
| 2008/0201734 A1* | 8/2008 | Lyon et al. ................. 725/34 |
| 2009/0228919 A1* | 9/2009 | Zott et al. .................. 725/34 |
| 2010/0162322 A1* | 6/2010 | Roberts et al. ............. 725/56 |

* cited by examiner

| Drama & Movie | Sports & Leisure | News & Reality | Movie & Theater | Show & Entertainment |
|---|---|---|---|---|
| 007 cinemax — IMAGE 21 — SPEED RACER | 004 BBC PRIME — IMAGE 31 — UEFA CUP 3 Round ITALY vs Turkey | 012 — 41 — Nightline Special | IMAGE 51 | 007 SHOWTIME — IMAGE 61 — BON JOVI LIVE |
| 037 FOX — IMAGE 22 — THE LISTENER | 020 ESPN — IMAGE 32 — MLB National League LAD vs Arizona | 016 CNN — IMAGE 42 — Inside Middle East | IMAGE 52 | 037 Disney — IMAGE 62 — Mr. Bean |
| 055 the movie channel — IMAGE 23 | 052 FOX — IMAGE 33 | 041 ESPNEWS — IMAGE 43 | IMAGE 53 | 055 STARZ — IMAGE 63 |

METHOD AND APPARATUS FOR PROVIDING ADVERTISEMENT SERVICE IN DIGITAL BROADCAST RECEIVER

PRIORITY

This application claims the benefit under 35 U.S.C. §119(a) of a Korean Patent Application filed in the Korean Intellectual Property Office on Dec. 30, 2008 and assigned Serial No. 10-2008-0137590, the entire disclosure of which is hereby incorporated by reference.

BACKGROUND OF THE INVENTION

1. Field of the Invention

The present invention relates generally to a method and apparatus for providing a broadcast service in a digital broadcast receiver, and more particularly, to a method and apparatus for providing an advertisement service in a digital broadcast receiver.

2. Description of the Related Art

Recently, with the development of broadcast technology and the change in needs of viewers, the broadcast environment undergoes a sudden change.

Among others, the recent broadcast environment undergoes a significant change, such as the change from analog broadcasting to digital broadcasting, the diversification of broadcast media from the terrestrial waves to the cable and/or satellite, and the provision of interactive broadcast services over a communication network.

An example of the typical service that appeared in this environment may include an Internet Protocol Television (IPTV) service, which is a digital broadcast service based on Internet Protocol (IP). The IPTV service, which refers to an interactive television service provided over a broadband IP network, connects with a content server over the IP network via a TV set-top box, which is a digital broadcast receiver, and provides broadcasting and other contents to a television receiver. Such an IPTV service can be a kind of digital convergence because it is convergence of Internet and television. Broadcasting over IPTV service is different from the over-the-air broadcasting in that a viewer can selectively enjoy desired programs at his/her own convenience. A digital broadcast receiver based on IPTV service supports an Electronic Program Guide (EPG) service for user's convenience.

At present, the improvement of capabilities of digital broadcast receivers and the increase in capacity of available memories have made it possible for the digital broadcast receivers to compose a screen by processing received contents.

As the capabilities of digital broadcast receivers have been improved and the digital broadcast receivers can compose a screen by processing received contents, content providers can offer users advertisements provided by advertisers after processing the advertisements in the desired form. However, while users are surfing the Internet to find desired contents, the content providers may not offer the users the advertisement effects aimed by the advertisers.

Therefore, in line with the development of capabilities of the digital broadcast receivers, there is a need for a plan to efficiently service advertisements on the digital broadcast receivers.

SUMMARY OF THE INVENTION

An aspect of the present invention is to address at least the above-mentioned problems and/or disadvantages and to provide at least the advantages described below. Accordingly, an aspect of the present invention provides an advertisement service method and apparatus capable of maximizing an effect of advertisements that are provided to a user on a digital broadcast receiver.

In accordance with one aspect of the present invention, there is provided a method for providing an advertisement service in a digital broadcast receiver. The method includes receiving a broadcast signal over a broadcast network; extracting configuration data of lattice-type video contents and at least one advertisement video from the received broadcast signal; editing the extracted configuration data of lattice-type video contents and displaying the edited configuration data on a display means of a user terminal as a channel selection screen; upon receipt of a focus move request from a user while providing the channel selection screen, selecting a video content corresponding to the focus move request; and if a focus moved by the focus move request of the user has been located on the selected video content for a predetermined time or more, displaying the advertisement video on the display means in contiguity with the selected video content.

In accordance with another aspect of the present invention, there is provided an apparatus for providing an advertisement service in a digital broadcast receiver. The apparatus includes a data converter for receiving a broadcast signal over a broadcast network, and extracting configuration data of lattice-type video contents and at least one advertisement video from the received broadcast signal; a content screen composer for editing the configuration data of lattice-type video contents, extracted by the data converter, and outputting content screen configuration data for providing a channel selection screen; a display for providing multiple video contents on the channel selection screen according to the content screen configuration data provided from the content screen composer; and a focus monitor for monitoring whether a focus move request is received from a user while the display is providing the channel selection screen. If it is determined by the focus monitor that the focus move request has been received from the user, the content screen composer generates the content screen configuration data to select a video content corresponding to the focus move request and display the selected video content, and if a focus moved by the focus move request has been located on the selected video content for a predetermined time or more, the content screen composer generates the content screen configuration data to display the advertisement video on the display in contiguity with the selected video content.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Figure 1:
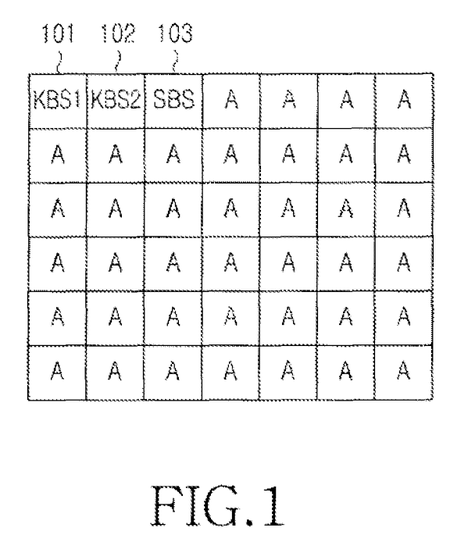
FIG. 1 is a diagram showing lattice-type video contents created by a sending side in a digital broadcast system to which the present invention is applied.
Figure 2:
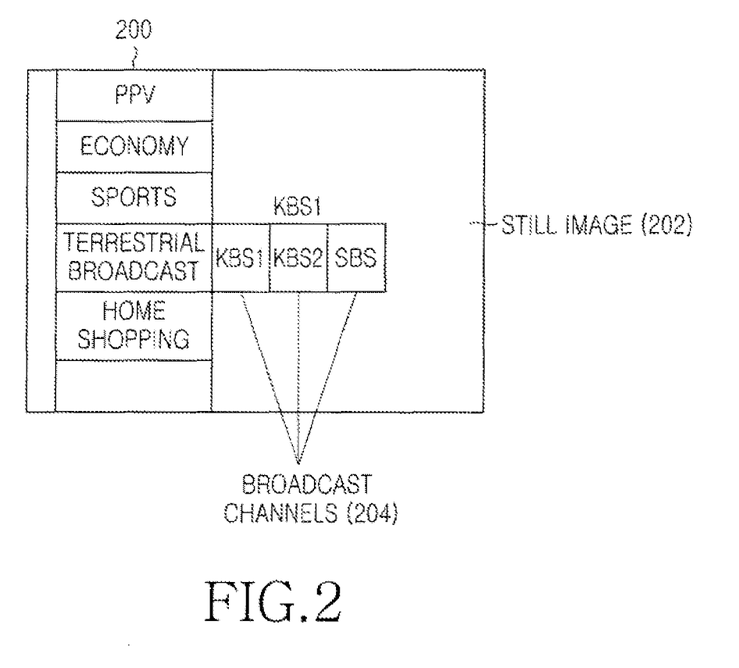
FIG. 2 is a diagram showing an example of a final screen displayed on a display after a receiving side has processed the lattice-type video contents shown in FIG. 1.

In a digital broadcast system to which the present invention is applied, a sending side processes video contents of broadcast channels into lattice-type videos and then broadcast them as shown in FIG. 1, and a receiving side may provide the lattice-type videos taking a user interface into account as shown in FIG. 2.

FIG. 1 shows lattice-type video contents that a sending side created by arranging video contents of respective broadcast channels in a digital broadcast system to which the present invention is applied. FIG. 2 shows an example of a final screen displayed on a display after a receiving side has processed the lattice-type video contents shown in FIG. 1.

In FIG. 1, KBS1 101, KBS2 102 and SBS 103 represent video contents provided by associated broadcasting companies, and may include news, dramas, sports, etc. Aside from these, "A"s represent video contents provided by associated broadcasting companies or program providers.

FIG. 2 shows a screen that a digital broadcast receiver to which the present invention is applied, has displayed after processing the lattice-type video contents of FIG. 1 according to a predetermined form. In FIG. 2, reference numeral 200 represents categories including associated video contents, and reference numeral 204 represents broadcast channels included in a terrestrial broadcast category, i.e., video contents provided by the broadcast channels. Reference numeral 202 represents a still image provided by the broadcast channel KBS1 among the broadcast channels indicated by reference numeral 204.

In case of a digital broadcast receiver to which the present invention is applied, advertisements are provided in some of the lattice-type videos and the digital broadcast receiver provides the advertisements in a particular position on the screen in arranging channels.

However, since the user's interest is concentrated in a channel to be surfed while the user is surfing the channel, advertisements may disappear from the screen during the channel surfing, making it difficult to achieve the advertisement effects aimed by advertisers.

Therefore, exemplary embodiments of the present invention described below are directed to a method and apparatus for maximizing the advertisement effects.

Generally, digital broadcasting converts a broadcast signal into a digital signal and broadcasts the digital signal over a satellite, terrestrial waves, or a cable, and a user receives the broadcast signal over a wire/wireless digital broadcast receiver and views desired broadcast channels. Recently, a variety of video contents may be provided together with the existing terrestrial/cable broadcastings on a digital broadcast receiver. Therefore, the term "video content," as used herein, may include the ordinary video contents, the broadcast services provided on a channel-by-channel basis, and the purchasable individual On-Demand type broadcast items. For example, the video contents used in the present invention may include not only such contents as movies and broadcast services provided by broadcasting stations, but also movie posters, logos of broadcasting stations or distributors providing contents, still images, and the like, and may also include applications such as games.

A user digital broadcast receiver to which the present invention is applied may be embodied not only in standard middleware environments such as Multimedia Home Platform (MHP), Open Cable Application Platform (OCAP) and Advanced Common Application Platform (ACAP), and non-standard middleware environments, but also in Zapper Box (or simple channel receiver) that supports only Free-to-Air (FTA) reception.

Figure 3:
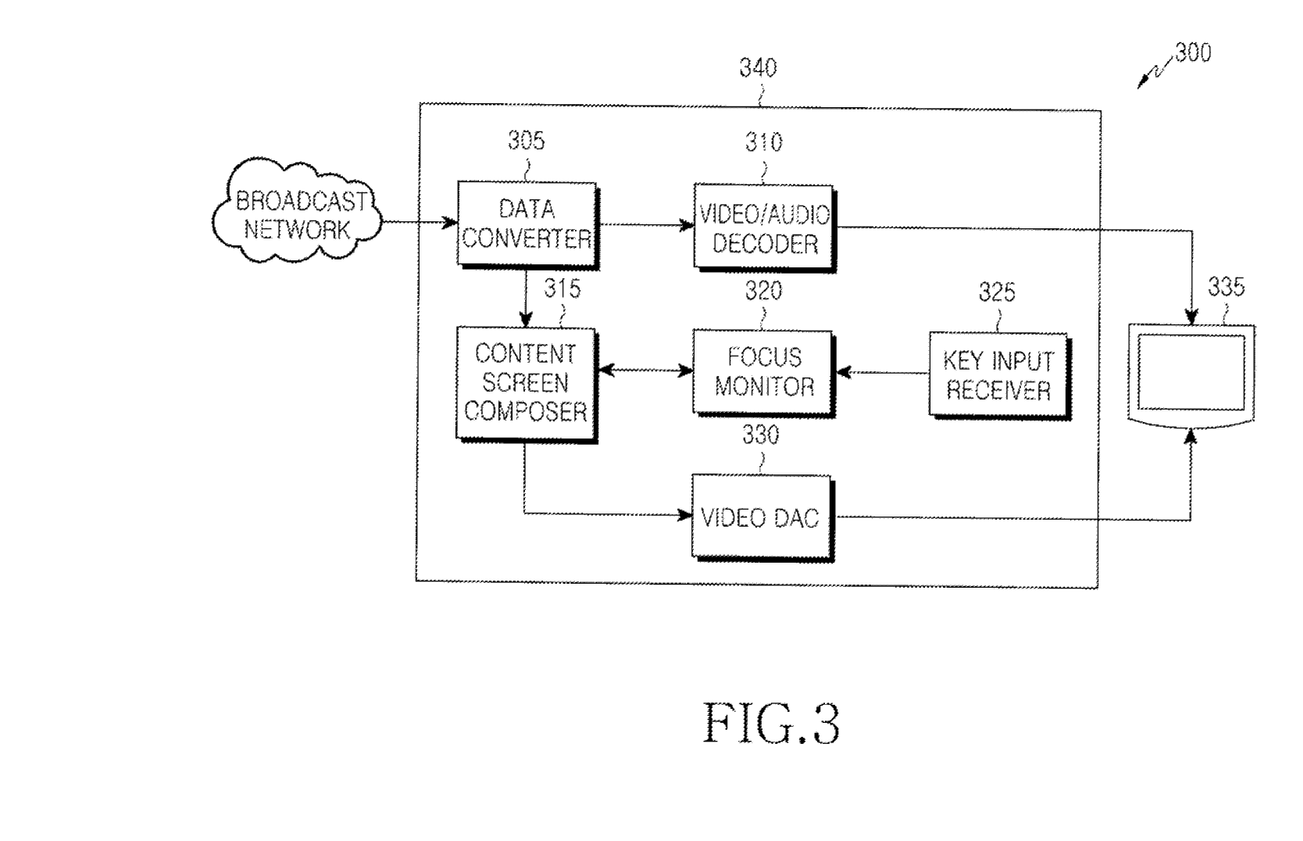
FIG. 3 is a block diagram of a digital broadcast receiver for providing an advertisement service according to an embodiment of the present invention.

FIG. 3 shows a block diagram of a digital broadcast receiver 300 for providing an advertisement service according to an embodiment of the present invention. The digital broadcast receiver 300 may include every kind of terminals capable of receiving digital broadcasting, such as a digital TV, a computer device with a broadcast receiving module, a notebook computer, a Portable Multimedia Player (PMP), and a mobile terminal.

The digital broadcast receiver 300 includes a set-top box 340 for outputting a video signal and an audio signal based on a broadcast signal from a content provider, and a video/audio output means for providing the video signal and the audio signal from the set-top box 340 to a user. The video/audio output means may be a TV 335 and the like, which includes a display means such as a Liquid Crystal Display (LCD).

The set-top box 340 includes a data converter 305, a video/audio decoder 310, a content screen composer 315, a focus monitor 320, a key input receiver 325, and a video Digital to Analog Converter (DAC) 330.

The data converter 305 receives a broadcast signal from the content provider, and extracts lattice-type video content-related data, configuration data of lattice-type video contents, and at least one advertisement video, from the received broadcast signal. If video/audio data is included in the broadcast signal from the content provider, the data converter 305 extracts the video/audio data and outputs the extracted data to the video/audio decoder 310. The video/audio decoder 310 decodes the video/audio data received from the data converter 305 and provides the decoded data to the display means 335.

The lattice-type video content-related data is lattice-type video contents and their associated data, and includes content-related text data, still image data, movie posters, logos of broadcaster or distributors, still images, audio clip images, etc.

The configuration data of lattice-type video contents means data related to a configuration of a lattice-type video channel list, including position, size, and identification information of multiple video contents arranged in a lattice form. In the following description, the configuration data of lattice-type video contents may also include the lattice-type video content-related data.

In exemplary embodiments of the present invention, the digital broadcast receiver 300 composes a channel selection screen through such operations as graphic editing and video editing, using the configuration data of lattice-type video contents, and provides the channel selection screen to the user using the display means 335.

In addition, the term "focus move request" used through the specification refers to requesting to move to a particular video content and select the video content based on an up/down/left/right button or a numeric button on a remote controller, which is input by the user. Further, the term "focusing" refers to activating and displaying a video content that has been requested and selected by the user. In order to be distinguished from other video contents, the focused video content may be displayed in a different color, or only the focused video content may be activated, or the focused video content may be located in the center of the screen or displayed greater than other video contents.

As to the advertisement video, which is an advertisement video provided from the advertiser, the content provider delivers the advertisement video along with the broadcast signal.

The data converter 305 receives and demodulates the broadcast signal broadcasted over the broadcast network, extracts configuration data of lattice-type video contents and at least one advertisement video from the received broadcast signal, and provides the extracted data and video to the content screen composer 315.

The content screen composer 315 composes a screen to be displayed on the display means 335 based on the configuration data of lattice-type video contents, provided from the data converter 305. That is, the content screen composer 315 generates content screen configuration data to be displayed on the display means 335 using the configuration data of lattice-type video contents to provide a channel selection screen according to exemplary embodiments of the present invention. To provide the channel selection screen, the content screen composer 315 performs video editing and graphic editing on the configuration data of lattice-type video contents, received from the data converter 305. While the channel selection screen is being provided to the user, the content screen composer 315 analyzes a focus move request signal that is input from the user on the focus monitor 320. Based on the analysis, the content screen composer 315 generates content screen configuration data, and outputs the generated data to the video DAC 330 thereby to provide a channel selection screen with the user selected content data to the user. The focus move request signal is a signal with which the user requests to move the focus to a particular video content using a remote controller or other means on the channel selection screen provided by the display means 335.

The channel selection screen according to exemplary embodiments of the present invention includes a curved circular selection screen, a full search screen, and a mini-search screen, and a description thereof will be made with reference to FIGS. 5 to 7. In order to support each of the above channel selection screens, the content screen composer 315 generates content screen configuration data according to each channel selection screen and outputs the generated data to the display means 335 via the video DAC 330.

The video DAC 330 converts the content screen configuration data generated by the content screen composer 315 into analog data, and outputs the analog data to the display means 335.

Upon receiving a focus move request from the user through the key input receiver 325, the focus monitor 320 provides a focus move request signal to the content screen composer 315. Upon receiving the focus move request signal from the focus monitor 320, the content screen composer 315 generates content screen configuration data according to the focus move request so that a particular video content may be displayed in a focused manner, and then outputs the generated data to the video DAC 330.

If a focus has been located on a particular video content for a predetermined time or more, the content screen composer 315 generates the content screen configuration data such that an advertisement video extracted from the broadcast signal may be displayed in contiguity with the particular video content. Whether a focus has been located on a particular video content for a predetermined time or more can be determined by the focus monitor 320 by checking if a focus move request has not been received from the user for a predetermined time after the particular video content was focused.

Figure 4:
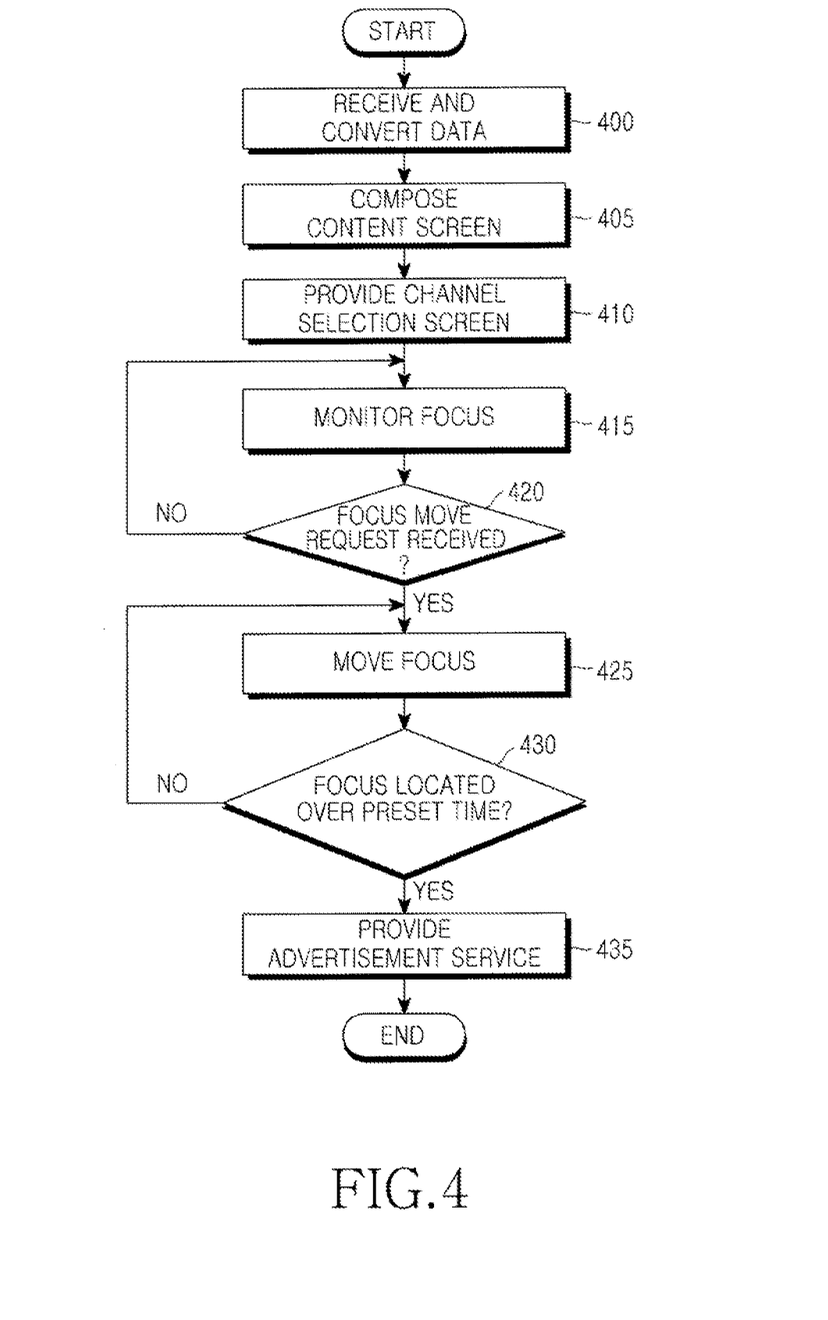
FIG. 4 is a flowchart showing a method for providing an advertisement service according to an embodiment of the present invention.

FIG. 4 shows a method for providing an advertisement service according to an embodiment of the present invention.

In step 400, the digital broadcast receiver 300 receives a broadcast signal broadcasted over a broadcast network, converts the received broadcast signal, and extracts configuration data of lattice-type video contents and at least one advertisement video from the received broadcast signal. The digital broadcast receiver 300 composes a content screen using the configuration data of lattice-type video contents in step 405, and provides any one of the three different channel selection screens designed according to exemplary embodiments of the present invention in step 410. The digital broadcast receiver 300 monitors the focus from the user in step 415, and determines in step 420 whether a focus move request is received.

Upon receiving a focus move request in step 420, the digital broadcast receiver 300 moves the focus in step 425. Upon failure to receive a focus move request, the digital broadcast receiver 300 returns to step 415 and monitors the focus.

After moving the focus in step 425, the digital broadcast receiver 300 determines in step 430 whether the focus has been located on the selected video content for a predetermined time or more. If the focus has been located on the selected video content for a predetermined time or more, the digital broadcast receiver 300 provides an advertisement service according to exemplary embodiments of the present invention in step 435.

However, if the focus has not been located on the selected video content for a predetermined time or more in step 430, which indicates that a focus move request has been received from the user, then the digital broadcast receiver 300 returns to step 425 and moves the focus.

Figure 5:
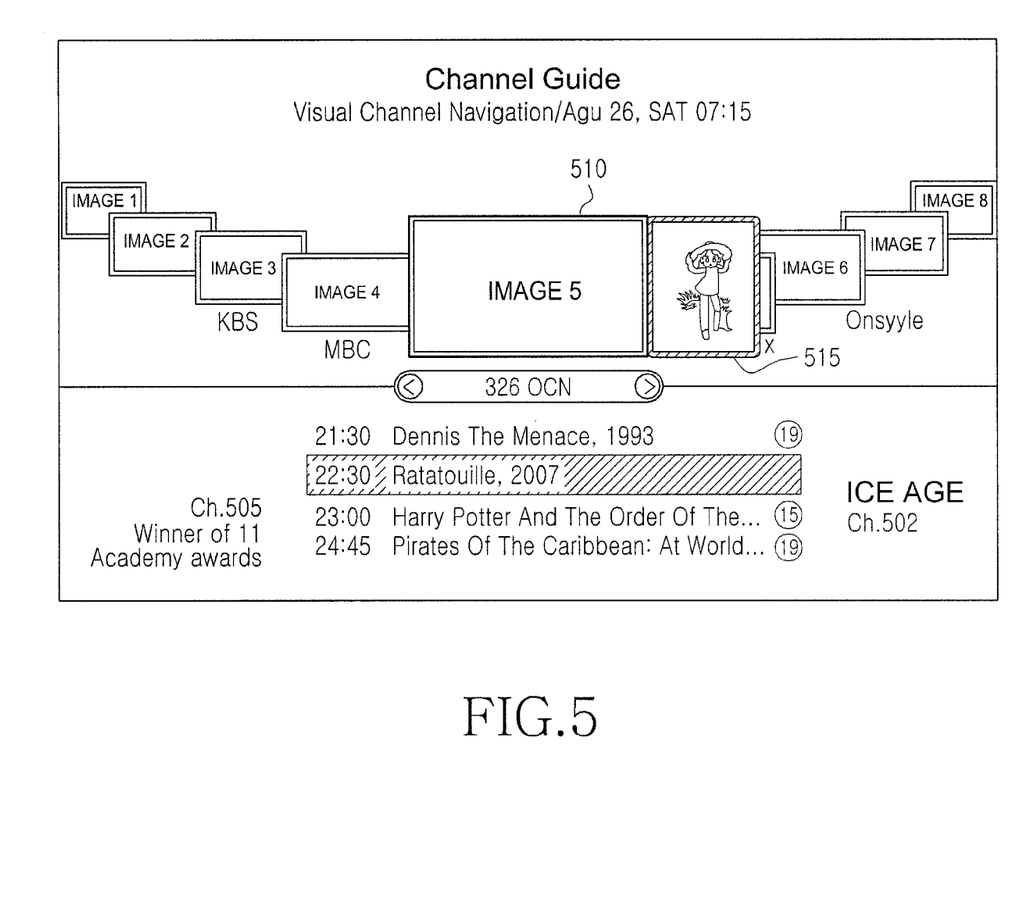
FIG. 5 is a diagram showing a method for providing an advertisement service according to a first embodiment of the present invention.

FIG. 5 shows a method for providing an advertisement service according to a first embodiment of the present invention, in which lattice-type video contents are arranged on a channel selection screen based on a curved circular selection screen.

Referring to FIG. 5, the digital broadcast receiver 300 according to the first embodiment of the present invention displays a focused video content 510 in the center of the channel selection screen, with the focused video content 510 enlarged compared to other unfocused video contents.

A size of video contents arranged near the focused video content 510 is set larger, while a size of video contents arranged far from the focused video content 510 is set smaller little by little.

In accordance with the first embodiment of the present invention, the digital broadcast receiver 300 provides an advertisement video 515 in contiguity with the focused video content 510 if no focus move request has been received from the user for a predetermined time.

While the advertisement video 515 is located in a side of the focused video content 510 in FIG. 5, the advertisement video 515 may be located in the bottom or top of the focused video content 510. Also, while the advertisement video 515 is displayed overlapping the unfocused video contents in FIG. 5, the advertisement video 515 may be displayed without overlapping.

In FIG. 5, a channel "326 OCN" is currently a focused video content, but if a focus move request to the left is received from the user, then a channel "MBC" arranged at the left of the currently focused video content will become a focused video content and be located in the center of the screen. If no focus move request is received from the user until lapse of a predetermined time after the channel "MBC" was focused, the digital broadcast receiver 300 will provide an advertisement service in contiguity with the focused video content "MBC" according to an embodiment of the present invention.

Figure 6:
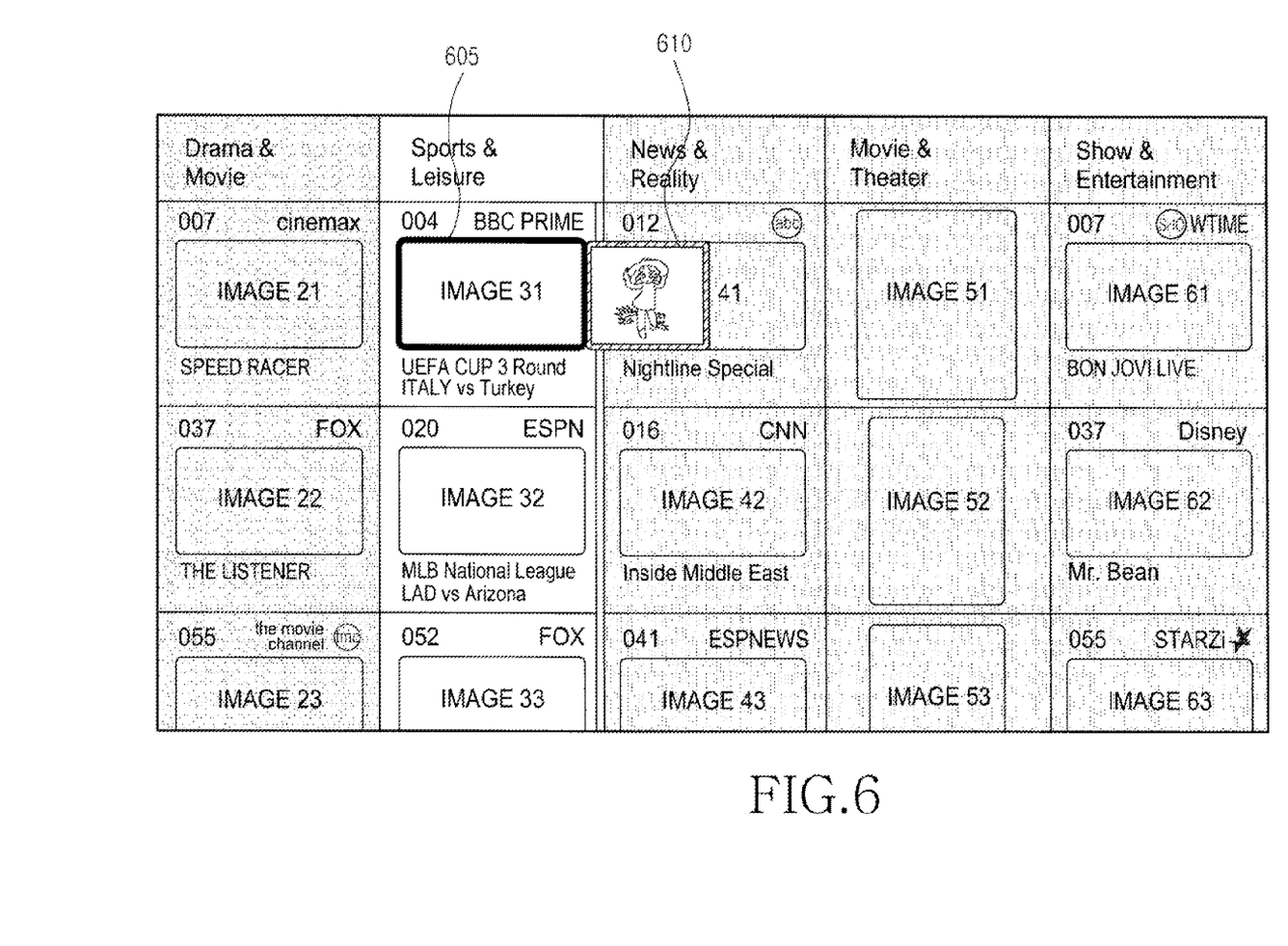
FIG. 6 is a diagram showing a method for providing an advertisement service according to a second embodiment of the present invention.

FIG. 6 shows a method for providing an advertisement service according to a second embodiment of the present invention, in which, unlike in FIG. 5, an advertisement video according to the present invention is provided on the full search screen on which the lattice-type video contents are classified into categories and displayed.

In FIG. 6, reference numeral 605 represents a video content that is currently focused by a focus move request of the user. An advertisement video 610 is provided in contiguity with the focused video content 605, and the advertisement video 610 is displayed overlapping a video content arranged near the focused video content 605. While the currently focused video content 605 is a channel "004" in a Sports & Leisure category in FIG. 6, if a focus move request from the user is received (or if an up/down/left/right key input is received), then a video content corresponding to the focus move request will be focused.

For example, if an up/down key is input, then a particular video content will be focused in the up/down direction within the Sports & Leisure category. If the particular video content is focused, it will be displayed taking into account the number of video contents that can be displayed on the display means 335. If a left/right key is input, a video content will be focused, which is within a Drama & Movie category or a News & Reality category located at the left or right of the Sports & Leisure category, which corresponds to the input left/right key.

Similarly, even in FIG. 6, while "004 BBC prime" in the Sport & Leisure category is currently a focused video content, if a focus move request such as a left key is received from the user, then "007 cimemax" in the Drama & Movie category will become a focused video content. If no focus move request is received from the user until lapse of a predetermined time after the "007 cimemax" was focused, then the digital broadcast receiver 300 will provide an advertisement service in contiguity with the focused video content "007 cimemax" according to an embodiment of the present invention.

Figure 7:
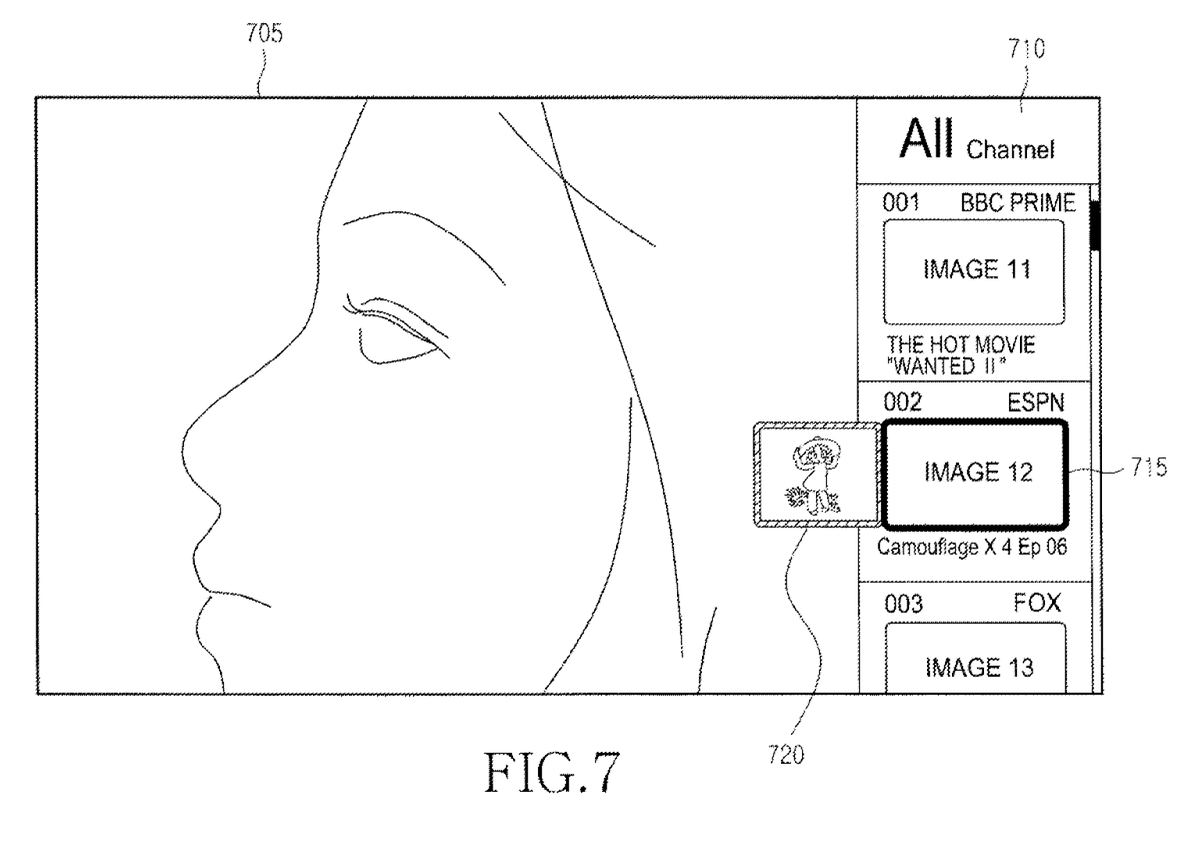
FIG. 7 is a diagram showing a method for providing an advertisement service according to a third embodiment of the present invention.

FIG. 7 shows a method for providing an advertisement service according to a third embodiment of the present invention.

Unlike in FIGS. 5 and 6, in FIG. 7, a particular video content is provided in a full screen and while a mini-search screen on which the user can search video contents included in a particular category is provided on one side of the entire screen, an advertisement video according to the present invention is provided.

Reference numeral 705 represents a video content provided on the entire screen, reference numeral 715 represents a focused video content, and reference numeral 710 represents a category in which the currently focused video content is included.

The third embodiment of the present invention provides an advertisement video 720 on the entire screen in contiguity with the focused video content 715 in an overlapping manner, if no focus move request is received from the user until lapse of a predetermined time for the focused video content while providing the mini-search screen. As described above, even in FIG. 7, while the currently focused video content 715 is a video content "002ESPN", if another video content is focused by a focus move request from the user and thereafter no focus move request is received for a predetermined time, then an advertisement service may be provided in contiguity with above another video content.

As is apparent from the foregoing description, according to exemplary embodiments of the present invention, it is possible to maximize an effect of advertisements that are provided to a user on a digital broadcast receiver.

The method and apparatus according to exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing an advertisement service in a digital broadcast receiver, comprising:
    receiving a broadcast signal including a configuration data of lattice-type video contents, and at least one advertisement video over a broadcast network;
    extracting the configuration data of lattice-type video contents, and at least one advertisement video included in the received broadcast signal;
    editing the extracted configuration data of lattice-type video contents;
    displaying the edited configuration data on a display means of a user terminal as a channel selection screen;
    in response to a focus move request from a user while providing the channel selection screen, selecting a video content corresponding to the focus move request; and
    if a focus moved by the focus move request of the user has been located on the selected video content for a predetermined time or more, contemporaneously displaying, on the display means, the selected video content on the channel selection screen and the advertisement video,
    wherein a display position of the advertisement video on the display means is configured, so as to display the advertisement video adjoining a one side of the selected video content based on a display position of the selected video content, wherein a display position of the advertisement video is not located on the selected video content and additional information related to the selected video content, wherein a display position of the additional information is configured so as to display the additional information adjoining one side of the selected video content, wherein the advertisement video is displayed overlapping a video content adjoining the selected video content, and wherein the channel selection screen is a curved circular selection screen on which the lattice-type video contents are arranged in a circular way.

2. The method of claim 1, further comprising determining whether the focus has been located on the selected video content for the predetermined time or more.

3. The method of claim 1, wherein the channel selection screen is a full search screen on which the lattice-type video contents are classified into categories.

4. The method of claim 1, wherein the channel selection screen is a mini-search screen that provides a video content in a full screen and displays video contents included in a particular category among the lattice-type video contents on one side of the entire screen.

5. The method of claim 1, further comprising:
displaying a video file associated with the selected video content.

6. The method of claim 1, wherein the additional information is at least one of a program scheduling information of a channel corresponding to the selected video content, a program title of the selected video content, and a channel information corresponding to the selected video content.

7. An apparatus for providing an advertisement service in a digital broadcast receiver, the apparatus comprising:
a data converter configured to receive a broadcast signal including a configuration data of lattice-type video contents, and at least one advertisement video over a broadcast network, and extract the configuration data of lattice-type video contents, and the at least one advertisement video included in the received broadcast signal;
a display configured to provide multiple video contents on a channel selection screen; and
at least one controller configured to edit the configuration data of lattice-type video contents, extracted by the data converter, and output content screen configuration data for providing the channel selection screen to the display, and observe whether a focus move request is received from a user while the display is providing the channel selection screen;

wherein if it is determined by the at least one controller that the focus move request has been received from the user, the at least one controller generates the content screen configuration data to select a video content corresponding to the focus move request and display the selected video content, and if a focus moved by the focus move request has been located on the selected video content for a predetermined time or more, the at least one controller generates the content screen configuration data to contemporaneously display, on the display, the selected video content on the channel selection screen and the advertisement video, wherein a display position of the advertisement video on the display is configured, so as to display the advertisement video adjoining a one side of the selected video content based on a display position of the selected video content, wherein a display position of the advertisement video is not located on the selected video content and additional information related to the selected video content, wherein a display position of the additional information is configured so as to display the additional information adjoining one side of the selected video content, wherein the advertisement video is displayed overlapping a video content adjoining the selected video content, and wherein the channel selection screen is a curved circular selection screen on which the lattice-type video contents are arranged in a circular way.

8. The apparatus of claim 7, wherein the at least one controller determines whether the focus has been located on the selected video content for the predetermined time or more.

9. The apparatus of claim 7, wherein the channel selection screen is a full search screen on which the lattice-type video contents are classified into categories.

10. The apparatus of claim 7, wherein the channel selection screen is a mini-search screen that provides a video content in a full screen and displays video contents included in a particular category among the lattice-type video contents on one side of the entire screen.

11. The apparatus of claim 7, wherein the display of the selected video content corresponds to display of a video file associated with the selected video content.

12. The apparatus of claim 7, wherein the additional information is at least one of a program scheduling information of a channel corresponding to the selected video content, a program title of the selected video content, and a channel information corresponding to the selected video content.

* * * * *